(12) United States Patent
Samuel et al.

(10) Patent No.: US 11,632,375 B2
(45) Date of Patent: Apr. 18, 2023

(54) AUTONOMOUS DATA SOURCE DISCOVERY

(71) Applicant: Exerro, Inc., Beaverton, OR (US)

(72) Inventors: Ajith Samuel, Beaverton, OR (US);
Shashidar Angadi, Beaverton, OR (US); Bobby Balachandran, Beaverton, OR (US); Sathishprabhu Jayabal, Tamil Nadu (IN); Arun Sivakumar, Tamil Nadu (IN); Sathiaseelan Kuppasamy, Tamil Nadu (IN); Prabhu Ponnuswamy, Tamil Nadu (IN); Lawrence Antony, Tamil Nadu (IN); Gopi Thulasidoss, Tamil Nadu (IN); Samraj Krishnakumar, Tamil Nadu (IN); Kavitha Thangasami, Tamil Nadu (IN); Joe Sartors, Chesterfield, MO (US)

(73) Assignee: EXTERRO, INC., Beaverton, OR (US)

( * ) Notice: Subject to any disclaimer, the term of this patent is extended or adjusted under 35 U.S.C. 154(b) by 385 days.

(21) Appl. No.: 17/023,017

(22) Filed: Sep. 16, 2020

(65) Prior Publication Data
US 2022/0086160 A1    Mar. 17, 2022

(51) Int. Cl.
*G06F 21/00* (2013.01)
*H04L 9/40* (2022.01)
*G06F 9/54* (2006.01)
*G06F 9/451* (2018.01)

(52) U.S. Cl.
CPC ............ *H04L 63/101* (2013.01); *G06F 9/451* (2018.02); *G06F 9/547* (2013.01); *H04L 63/0876* (2013.01); *H04L 63/102* (2013.01)

(58) Field of Classification Search
CPC . H04L 63/101; H04L 63/0876; H04L 63/102; H04L 63/08; G06F 9/451; G06F 9/547; G06F 21/6218; G06F 8/36
See application file for complete search history.

(56) References Cited

U.S. PATENT DOCUMENTS

| | | | |
|---|---|---|---|
| 10,275,291 B2 * | 4/2019 | Ahmed | G06Q 30/08 |
| 11,157,498 B1 * | 10/2021 | James | G06F 9/542 |
| 2003/0028451 A1 * | 2/2003 | Ananian | G06Q 30/0615 |
| | | | 705/26.42 |
| 2011/0119150 A1 * | 5/2011 | Kane, Jr. | G06Q 30/0269 |
| | | | 705/26.7 |

(Continued)

*Primary Examiner* — Kendall Dolly
(74) *Attorney, Agent, or Firm* — Miller Nash LLP (57) ABSTRACT

A computer-implemented method of discovering data sources includes receiving a request at a computing device through a user interface identifying applications and any additional data source types associated with the applications, and parameters used to access the applications, automatically authenticating the computing device to applications that require authentication, using the parameters, making calls through a programming interface for each application requesting identification of data sources, receiving a list identified data sources through the programming interface, providing unique identifiers for each of the identified data sources, providing an access identifier that identifies users that have access to the data sources, and storing the identified data sources, unique identifiers, and access identifiers as a data source catalog.

20 Claims, 5 Drawing Sheets

(56) References Cited

U.S. PATENT DOCUMENTS

| | | | |
|---|---|---|---|
| 2015/0363458 A1* | 12/2015 | Cline | G06F 16/2365 |
| | | | 707/638 |
| 2016/0246592 A1* | 8/2016 | Jamjoom | G06F 8/36 |
| 2017/0228815 A1* | 8/2017 | Plaehn | G06Q 30/0639 |
| 2018/0373890 A1* | 12/2018 | Barday | G06F 21/6245 |
| 2020/0036594 A1* | 1/2020 | Savov | H04L 41/12 |
| 2021/0192412 A1* | 6/2021 | Krishnaswamy | |
| | | | G06Q 10/06316 |
| 2021/0304143 A1* | 9/2021 | Lucas | G06F 21/6245 |
| 2022/0383395 A1* | 12/2022 | Young | G06Q 30/0643 |

* cited by examiner

AUTONOMOUS DATA SOURCE DISCOVERY

TECHNICAL FIELD

This disclosure relates to data source discovery, more particularly to autonomous data source discovery.

BACKGROUND

Gathering information on the data sources of an organization generally involves a combination of manual and automated processes. A data source as used here means electronic content that contains relevant information, where the relevance results from a need of a current application. One such application, but by no means the only one, would be in electronic discovery, other may include data mining and data aggregation applications. Data sources may take the form of electronic files, generated by users using applications, stored somewhere in a computer system.

Currently, these sources may be identified through a series of interviews of relevant personnel to identify the applications used to allow identification of file types, audits of computer networks to determine storage of the file types, as well as identification of the custodians of the different sources. Actually accessing the data sources typically occurs on an application by application basis. Each application requires its own interface to pull the various data sources and their associations with custodians of the sources.

Periodic updates about the data sources may also involve re-doing work done previously, in whole or in part.

DETAILED DESCRIPTION

Many uses of data require identification of data sources across multiple applications and in multiple locations. In order to present or process the data sources, a process must first identify the sources and how to gain access to them, and the people or systems that manage those sources, referred to here as custodians. The embodiments here allow users to identify the data sources across the application and associate the data sources with both the people who have permission to access the sources and how access is gained.

Figure 1:
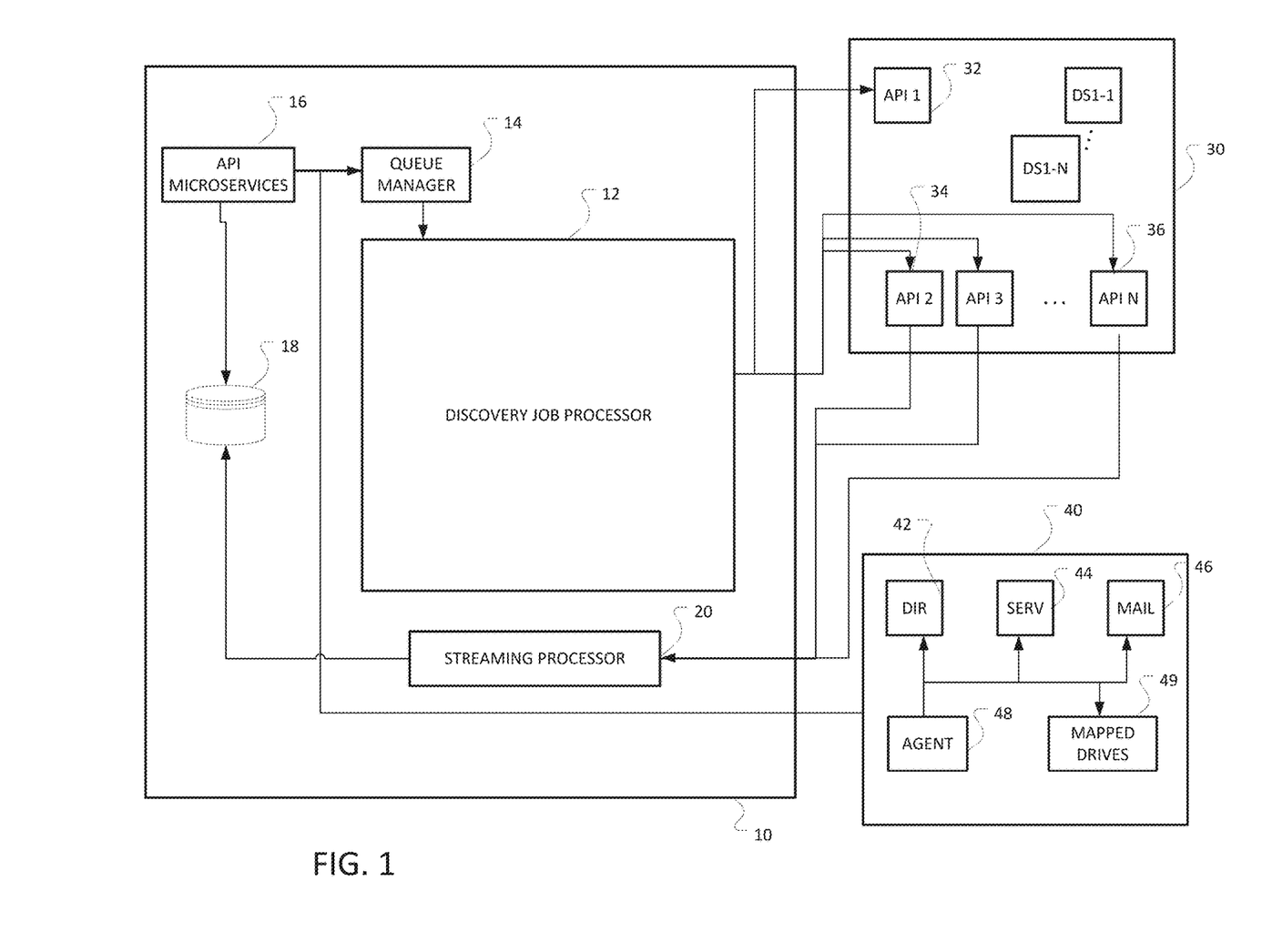
FIG. 1 shows an embodiment of a system to perform autonomous data source discovery.
Figure 2:
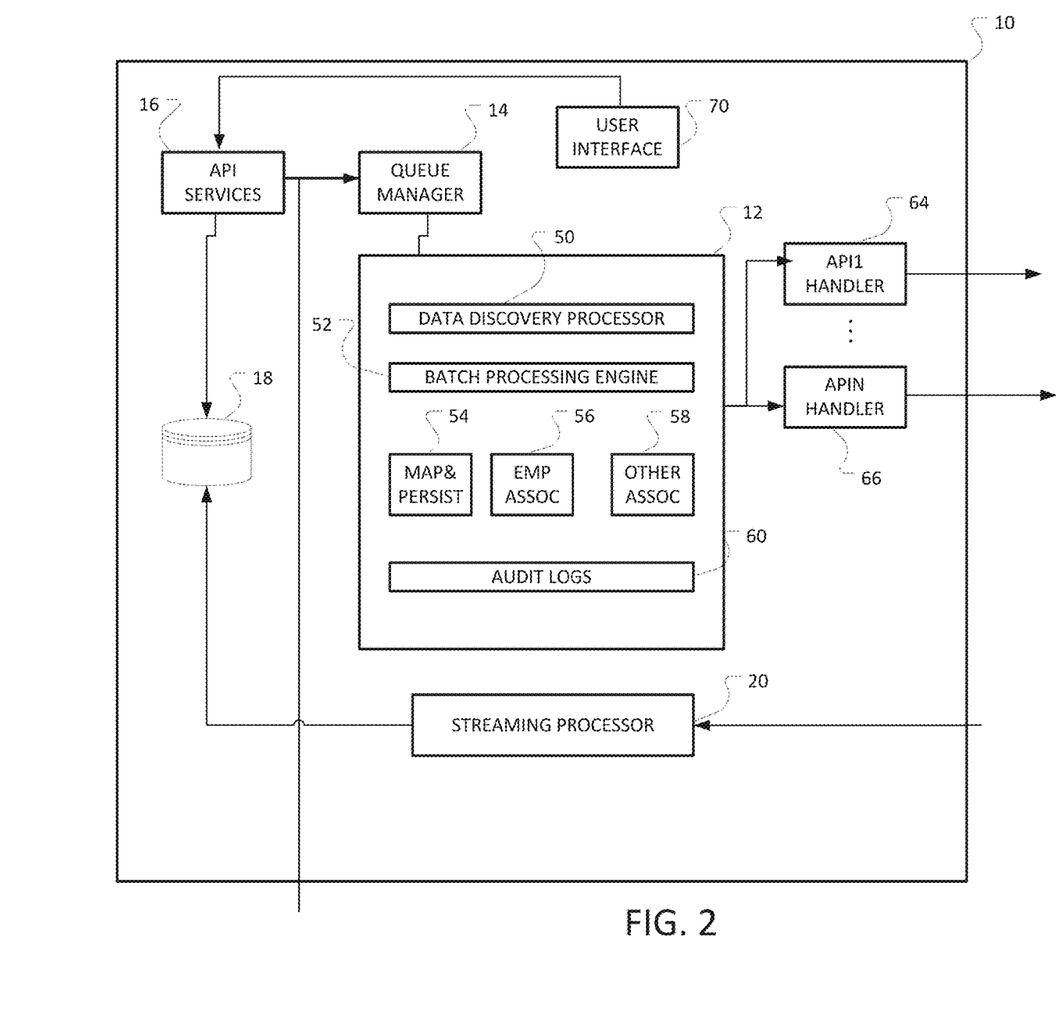
FIG. 2 shows an embodiment of a computing device for autonomous data source discovery.

FIG. 1 shows an embodiment of an environment in which data sources exist from applications internal to an organization and external, which may also be referred to as third-party applications. FIG. 2 shows a more detailed embodiment of the data source discovery job processor 10 of FIG. 1. In FIG. 1, the system that performs the data source discovery process 10 is shown with both internal data sources 40, meaning the organization provides the services that create the data sources, and external data sources 30, provided by third-party organizations, such as cloud-based services.

The discovery system 10 merely provides one embodiment of a system and may include may other features and components. In the embodiment shown, the discovery system has a discovery job processor 12, a streaming processor 20, an application programming interface (API) microservices manager 16, a data store 18, and a queue manager 14. The discovery processor will be discussed in more detail in FIG. 2.

The term processor or processing device as used here refers to any hardware component that executes code to process requests and data. This may include general purpose processors, digital signal processors, application specific integrated circuits (ASIC), field programmable gate arrays (FPGA), etc. The various processors referred to here may all be implemented as different partitions or portions of one physical processor, or may encompass multiple physical processor in one or more separate physical devices. The device may take the form of servers, cluster servers, individual computers, etc. For example, the streaming processor, which may receive pushed data from the applications the produce external data sources, may take the form of one or more servers.

The term "data source" as used here means a repository of electronic files that may include only one electronic file. The term "electronic file" means an electronic representation of content, such as text, illustrations, messages, documents, illustrations, logs, timelines, etc. The term "application" means those programs that generate the electronic files, this may include many different types of applications, such as word processors, spreadsheet applications, mail programs, network equipment that generates logs, online communications application such as Slack® and Jabber®, anything that generates and stores electronic data in any file format.

The queue manager 14 manages the various requests and responses that require processing assets of the discovery job processor 12. The API microservices module 16 comprises a layer, in one embodiment the REST (Representative State Transfer) API layer, which interacts with the user interface layer. It is responsible for handling primary business functions that include adding applications, configuring application authentication, setting up the auto-discovery jobs, etc. The discovery job processor 12 leverages different API handlers to interact with the internal and external system, and to fetch the data sources. The API handlers are implemented using a common connector API framework.

For the internal data sources 40, these generally consist of applications under control of the organization, such a directory services 42, and storage servers 44 that manage both data sources and access to the data storage with token, passwords, etc., mail programs 46, and mapped drives 49. The discovery system 10 may interact with these internal components through an agent 48 which may consist of an agent service that coordinates the on-premises discovery service.

External data sources 30 may include multiple applications. Some application may in turn include multiple applications. For example, Microsoft Office 365 may include application such as Word, Excel, Sharepoint, Teams, Exchange, OneDrive, etc. (all are registered trademarks of Microsoft Corporation). The application has multiple different types of data sources. As discussed in more detail later, users may pick and choose which types of data sources should be included. Each application will have its own API, such as API 1 32, API 2 34, through API N 36. As mentioned above, API 1 may be for Office 365, which has multiple types of data sources DS 1-1 through DS 1-N.

In addition to the various data sources these different applications have they may also have update services. These typically take the form of a real-time data push service, sometimes referred to as HTTP push API, web callback or webhook. The webhook service delivers data to other application as it happens. The webhooks act separately from any auto-scheduled discovery update processor enabled by the discovery system. The webhook data streams may be managed and gated by the streaming processor 20, as multiple applications may have webhooks capabilities.

FIG. 2 shows a more detailed view of the discovery system 10 and the discovery jobs processor 12 of FIG. 1. The discovery jobs processor has a data discovery processor 50 that operates on the data discovery requests and sends out the calls to the various handlers for each application such as 64. There may be multiple handlers from API 1 handler 64 to API N handler 66. The discovery jobs processor may also have a batch processing engine 52 to allow for more efficient management of all of the data coming in through the various communication channels. The batch processing engine may employ various modules to coordinate the data, such as a mapping and persistence processor 54, an employee association processor 56 to manage employee associations with the various data sources, and the other association processor 58 that manages other associations, such as between data sources. An audit log 60 allows monitoring of the various tasks and activities being performed.

Figure 3:
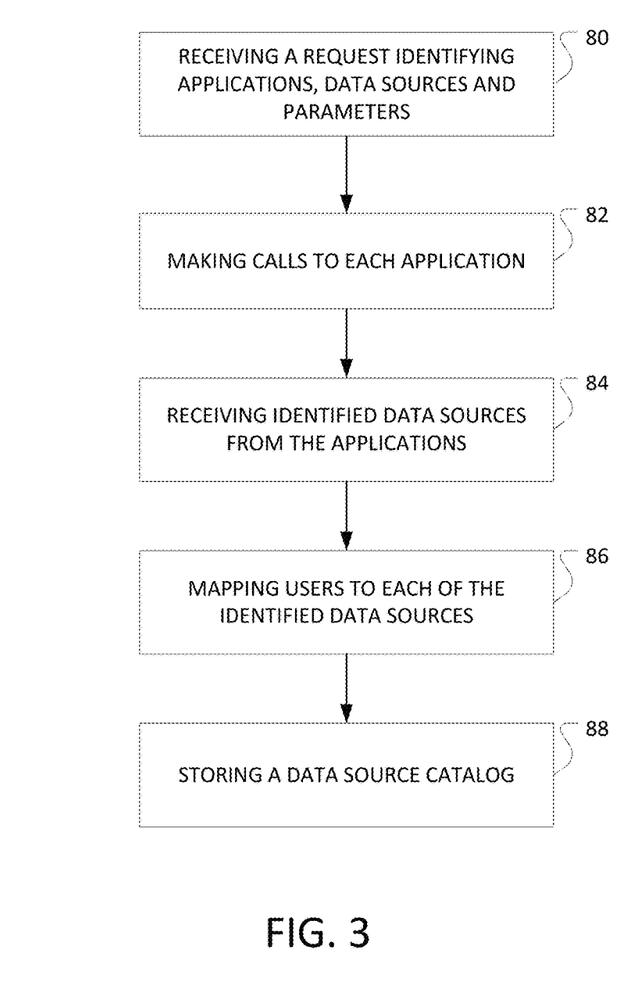
FIG. 3 shows a flowchart of an embodiment of a method of autonomous data source discovery.

Using such an architecture, without limitation, the discovery system can perform autonomous data source discovery. FIG. 3 shows a flowchart of an embodiment of such a process. In FIG. 3, the process begins a request at 80, which may be referred to as a job, through a user interface, such as 70 from FIG. 2, with an existing list that identifies applications and any additional data source types associated with the applications, and parameters used to access the applications. The development of the job information will be discussed with reference to FIG. 4. The additional data source types are those associated with an application that has multiple data source types as mentioned before. The discovery system, which may also be referred to as a platform uses this to start the data source discovery process.

The data source discovery process uses the parameters and permissions associated with each application to make calls to the applications through their APIs at 82. This may involve user names and passwords, other validation information, etc. For external applications, this may also involve service account usernames and passwords, such as if the organization has an organization-wide account. In the request, the users may designated which data sources the process should identify from each application. Using the Office 365 example, the user may designate Exchange, but not OneDrive, etc. The users may also provide information as to how the data sources should be identified, such as by name and a Globally Unique Identifier (GUID). This allows the data source catalog being built, or refreshed, to ensure that the data sources identified at 84 from the applications have unique identifiers at 86.

When the data source discovery system receives the responses at 84 and 86, the data source catalog is built at 88, or refreshed, as discussed below. The discovery system populates the data sources catalog and indicates who can access to each of these data sources, referred to as an access identifier. For example, when the process is discovering data sources associated with Microsoft Teams, the list of teams and list of employees who can access each of the Teams is indicated. Similarly, when the process is discovering SharePoint sites, the list of sites and employees who can access each of the sites is indicated. The request, or job, defines which types of data the catalog should include.

Figure 4:
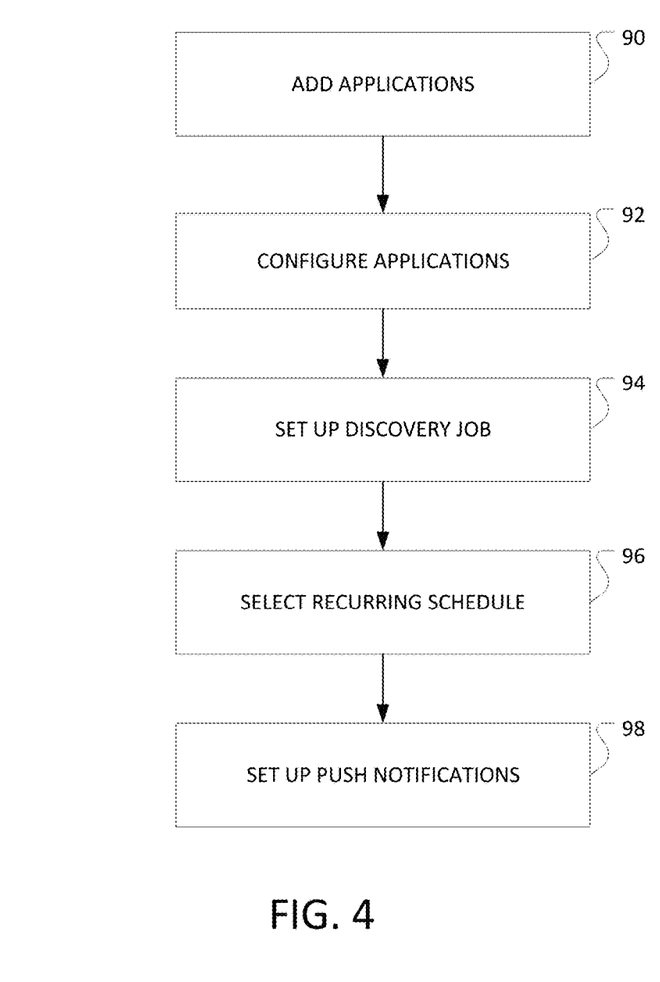
FIG. 4 shows a flowchart of an embodiment of a method of creating a data source job.
Figure 5:
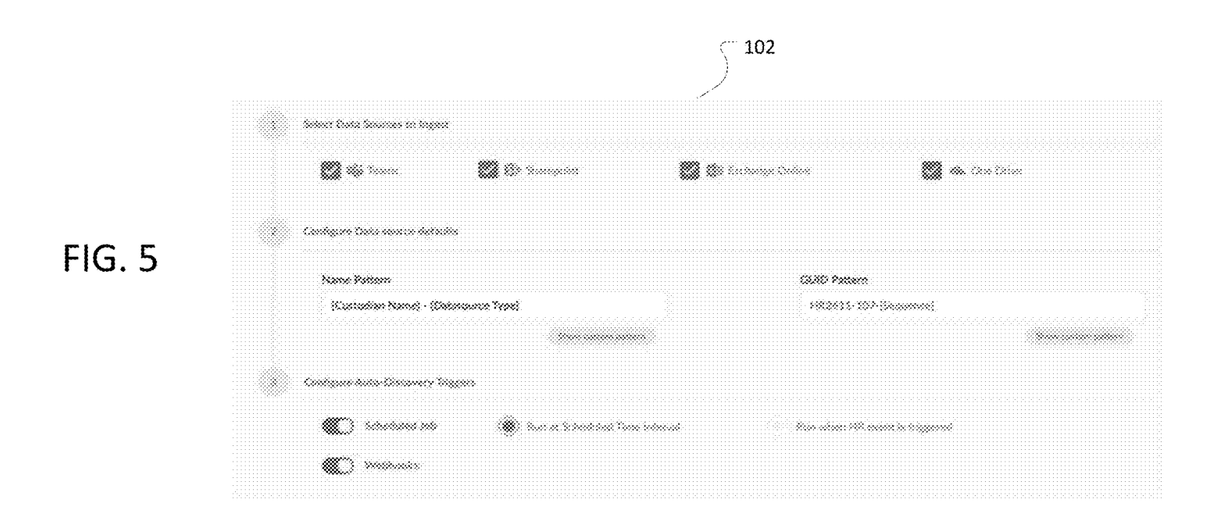
FIG. 5 shows an embodiment of a user interface for application identification.
Figure 6:
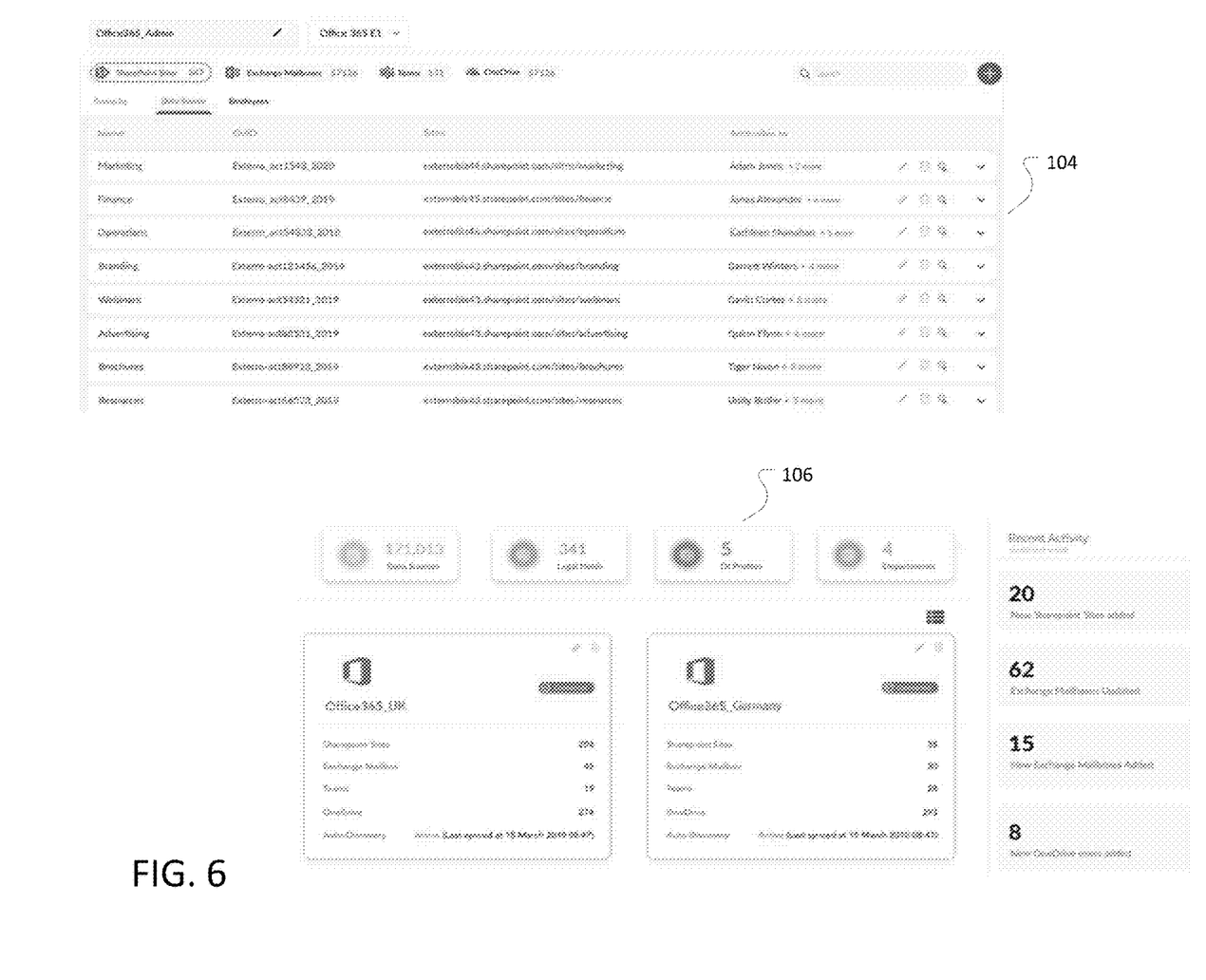
FIG. 6 shows an embodiment of user interface for a data source catalog and for data source monitoring.

FIG. 4 shows a flowchart of an embodiment of a process of generating a data source discovery request or job. FIGS. 5 and 6 show embodiments of related user interfaces. The process starts at 90 in FIG. 4 with users adding the applications that the organization uses both cloud and in-house data sources. FIG. 5 shows an embodiments of a user interface 100 to facilitate this process. Users can identify different applications across the departments either by interviewing the department heads and enter the applications in a data inventory, such as that available in the Exterro® process. Users can also import applications from the organizations information technology asset management system, if one exists, like the configuration management database (CMDB).

As discussed above, each application requires different set of parameters and permissions to enable the discovery system. The parameters must be provided by the users. If any end user needs to log in to an application, the user name and password has to be provided, so that their identity can be validated. Similarly, in order for the discovery system to connect to an external, third party system, certain parameters such as service account username and Password should be provided so that the third-party system can authenticate the discovery system and allow it to handle the interactions. This is a first part of configuring the applications to interact with the discovery system at 92.

The second part of configuring the applications to interact with the discovery system involves the user defined data sources to be discovered, the user providing the names and globally unique identifiers for each data source. This results in the data source discovery job being ready to send to the discovery system at 94.

One aspect of the discovery system is its autonomy. The data catalog must be refreshed periodically, such as weekly, monthly, etc. The user can select the frequency for the recurring schedule at 96. This enables the data source catalog to remain evergreen, allowing users to access the latest data source information at any point in time. The data source catalog will be refreshed each time, rather than newly built. A user interface for the scope, settings and scheduling is shown in FIG. 5 at 102. FIG. 6 shows an embodiment of a data source catalog at 104.

In addition, rather than autonomously running the data discovery job at a higher recurrence, the system can exploit any availability for subscription to key events as push notifications at 98, such as by a subscription to the webhooks, or establishing a webhooks end point, discussed above. In an example of the webhooks being deployed in the discovery system, assume a new channel has been created in Slack®. The discovery job has put calls into the Slack® through the API such that the creation of the channel causes the application to identify it as being related to the discovery job requests, either through a company service account, user names, etc. Slack® then notifies the streaming processor in the discovery system about the creation of the channel. The discovery job processor then retrieves the channel information and saves it in the data source catalog. The discovery job processor then also retrieves a list of members who are associated with the channel to update the data source catalog and associates those users with the channel.

This allows the data catalog to be automatically refreshed based upon events occurring that affect the data sources discovered by the process. This may allow the recurrence schedule to be set for longer periods of time, reducing expenses and system load. The discovery system may also add a monitoring interface to allow the user to see updates and changes to the data source catalog, as shown in FIG. 6 at 106.

This system and method enables several types of processes that rely upon identification of data sources. In one example, the data sources associated with a predetermine set of users may be gathered. For example, maybe the group associated with that set of users is undergoing some change or involved in some sort of interaction that requires identifying all of the data sources associated with that group. In another example, maybe the list of data sources is used to generate a collection of data sources associated with a particular type of data. In another example, the organization may want to use the data sources in a data mining application, which would require the actual data from some of the identified data sources to be retrieved. Having an autonomous data source discovery process allows whatever need to have access to the latest list of data sources sorted and selected by whatever parameter needed.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A computer-implemented method of discovering data sources, comprising:
   receiving a request at a computing device through a user interface identifying applications and any additional data source types associated with the applications, and parameters used to access the applications;
   automatically authenticating the computing device to applications that require authentication, using the parameters;
   making calls through a programming interface for each application requesting identification of data sources;
   receiving a list of identified data sources through the programming interface;
   providing unique identifiers for each of the identified data sources;
   providing an access identifier that identifies users that have access to the data sources; and
   storing the identified data sources, unique identifiers, and access identifiers as a data source catalog.

2. The computer-implemented method of claim 1, wherein receiving the request comprises:
   presenting a menu of applications to a user on the user interface; and
   receiving selections of applications through the user interface and identification of any of the additional data sources associated with the applications.

3. The computer-implemented method as claimed in claim 1, further comprising generating a list of applications from at least one of a pre-existing data inventory and an information technology management system.

4. The computer-implemented method as claimed in claim 3, wherein generating the list of applications comprises identifying applications with multiple types of data sources.

5. The computer-implemented method as claimed in claim 1, further comprising developing the programming interface for each application.

6. The computer-implemented method as claimed in claim 1, further comprising defining identification criteria for each data source.

7. The computer-implemented method as claimed in claim 1, further comprising establishing a frequency of repetitions of the computer-implemented method.

8. The computer-implemented method as claimed in claim 1, wherein storing the data source catalog comprising building the data source catalog and storing the data source catalog.

9. The computer-implemented method as claimed in claim 1, wherein storing the data source catalog comprises updating an existing data source catalog and storing the updated data source catalog.

10. The computer-implemented method as claimed in claim 9, further comprising subscribing to a webhook for at least one of the applications and updating the existing data source catalog comprises updating the existing data source catalog with the pushed data from the webhook.

11. The computer-implemented method as claimed in claim 10, further comprising retrieving a list of users associated with the pushed data and storing the list of users as part of updating the existing data source catalog.

12. The computer-implemented method as claimed in claim 1, further comprising accessing the data source catalog by a predetermined set of users to designate data sources associated with the predetermined set of users.

13. The computer-implemented method as claimed in claim 1, further comprising generating a collection of entries in the data source catalog by adding data sources selected from the data source catalog to the collection based upon at least one user having access to the data source.

14. The computer-implemented method as claimed in claim 1, further comprising accessing the data contained in the data sources for data mining.

15. A system for discovering data sources, comprising:
   a memory configured to store a data catalog of data sources and mapped users;
   a user interface to allow a user to provide information to the system;
   a connector to allow the system to communicate with local data sources;
   at least one programming interface to allow the system to communication with remote data sources;
   a processing device configured to execute code to cause the processing device to:
      receiving a request through the user interface identifying any applications and any data source types associated with the applications, and associated parameters used to access the data sources;
      automatically authenticating the computing device to applications that require authentication, using the parameters;
      identifying one of the at least one programming interface for each application;
      using the identified programming interfaces for the applications to make calls for data sources to the applications;
      receiving identified data sources through the programming interface;
      mapping users to each of the identified data sources;
      building a data source catalog with the identified data sources and mapped users;
      providing an access identifier that identifies users that have access to the data sources; and
      storing the data source catalog in the memory.

16. The system of claim 15, wherein the code to be executed by the processing device further causes the processing device to access and store code for programming interfaces for multiple applications.

17. The system of claim 15, wherein the code to be executed by the processing device further causes the processing device to subscribe to a webhook with at least one remote data source.

18. The system of claim 15, wherein the processing device comprises one processor.

19. The system of claim 15, wherein the processing device comprises multiple processors.

20. The system of claim 19, wherein the multiple processors are physically located in at least two different devices.

* * * * *